United States Patent
Bhageria et al.

(10) Patent No.: US 10,811,901 B2
(45) Date of Patent: Oct. 20, 2020

(54) SYSTEM AND METHOD TO DETERMINING EFFICIENCY OF A SMART APPLIANCE AND PROVIDING FEEDBACK BASED OF EFFICIENCIES OF SIMILAR SMART APPLIANCES IN A SMART GRID NETWORK

(71) Applicant: International Business Machines Corporation, Armonk, NY (US)

(72) Inventors: Gopal K. Bhageria, Kolkata (IN); Ravi Mandalika, South Perth (AU); Krishnasuri Narayanam, Bangalore (IN); Ramasuri Narayanam, Nagaram (IN)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 15/826,965

(22) Filed: Nov. 30, 2017

(65) Prior Publication Data
US 2019/0165606 A1   May 30, 2019

(51) Int. Cl.
*G05B 13/02* (2006.01)
*H02J 13/00* (2006.01)
(Continued)

(52) U.S. Cl.
CPC ........ *H02J 13/0017* (2013.01); *G05B 13/024* (2013.01); *H02J 3/14* (2013.01); *H02J 2310/14* (2020.01); *H04W 4/14* (2013.01)

(58) Field of Classification Search
None
See application file for complete search history.

(56) References Cited

U.S. PATENT DOCUMENTS 8,587,438 B2   11/2013  Abernethy et al.
9,225,766 B2   12/2015  Philip et al.
(Continued)

FOREIGN PATENT DOCUMENTS

CN   204517418       4/2015
WO   2016059627      1/2017

OTHER PUBLICATIONS

Time Based Rate Programs; Smartgrid.gov; https://www.smartgrid.gov/recovery_act/time_based_rate_programs.html; 3 pages; printed Nov. 27, 2017.
(Continued)

*Primary Examiner* — Mohammad Ali
*Assistant Examiner* — Vincent W Chang
(74) *Attorney, Agent, or Firm* — Aaron N. Pontikos (57) ABSTRACT

The present invention is a system and method for determining the efficiency of a smart appliance in a smart grid network and providing feedback based on the efficiencies of similar smart appliances in the smart grid network. The system includes a central controller in digital communication with a network component of a smart grid and smart appliances in the smart grid network. The smart appliances are associated with ADLs. An energy consumption measurement is calculated for the smart appliances for each ADL. A notification is transmitted from the central controller to a smart appliance or to the owner of the smart appliance indicating to repair or replace the smart appliance when the energy consumption measurement is below an inefficiency threshold. The energy consumption measurement is determined based on data such as appliance meta data, smart meter data, a user profile, user demographics, a user specific ADL schedule, and historical data.

15 Claims, 5 Drawing Sheets

(51) Int. Cl.
*H02J 3/14* (2006.01)
*H04W 4/14* (2009.01)

(56) References Cited

U.S. PATENT DOCUMENTS

| | | | |
|---|---|---|---|
| 9,230,560 | B2 | 1/2016 | Ehsani et al. |
| 9,523,993 | B2 | 12/2016 | Weaver et al. |
| 2010/0201573 | A1 | 8/2010 | Lamming |
| 2011/0046805 | A1 | 2/2011 | Bedros et al. |
| 2012/0290230 | A1* | 11/2012 | Berges Gonzalez ... G01D 4/004 702/61 |
| 2014/0101058 | A1 | 4/2014 | Castel et al. |
| 2014/0281650 | A1* | 9/2014 | Gilbert ................ H04L 12/2825 713/340 |
| 2015/0222476 | A1* | 8/2015 | Kondo ................ H04L 41/5061 709/223 |
| 2015/0262267 | A1* | 9/2015 | Inoue ..................... G06Q 50/06 705/34 |
| 2015/0369847 | A1* | 12/2015 | Roosli ..................... F24F 11/30 702/61 |
| 2017/0215261 | A1* | 7/2017 | Potucek ............... A61H 33/005 |

OTHER PUBLICATIONS

Smart Grid: Demand-side Management; Advanced Digital Sciences Center (ADSC) Illinois at Singapore Pte. Ltd.; 2 pages; printed Nov. 27, 2017.
Xie, Xia, et al.; Pricing Strategies in Grid Market: Simulation and Analysis; 2008 Seventh International Conference on Grid and Cooperative Computing; © 2008 IEEE; pp. 532-538.
Joe-Wong, Carlee, Optimized Day-Ahead Pricing for Smart Grids with Device-Specific Scheduling Flexibility; IEEE Journal on Selected Areas in Communications, vol. 30, No. 6, Jul. 2012, pp. 1075-1085.
Cook, D.J., et al.; Assessing the Quality of Activities in a Smart Environment; May 15, 2009; 19 pages.
Bae, Ihn-Han, et al.; An Ontology-Based ADL Recognition Method for Smart Homes; © Springer-Verlag Berlin Heidelberg 2011; T.-h. Kim et al. (Eds.): FGCN 2011, Part II, CCIS 266, pp. 371-380, 2011.
Chan, Marie, et al.; A Review of Smart Homes—Present State and Future Challenges; copyright 2008 Elsevier Ireland Ltd.; Computer Methods and Programs in Biomedicine 9I (2008) pp. 55-81.

* cited by examiner

SYSTEM AND METHOD TO DETERMINING EFFICIENCY OF A SMART APPLIANCE AND PROVIDING FEEDBACK BASED OF EFFICIENCIES OF SIMILAR SMART APPLIANCES IN A SMART GRID NETWORK

BACKGROUND

The present invention relates generally to optimizing power usage on a smart grid network, and more particularly to determining the efficiency of a smart appliance in a smart grid network and providing feedback based of efficiencies of similar smart appliances in the smart grid network.

An electrical grid is a network of transformers, substations, and individual consumers connected by transmission lines. Traditionally, electricity was delivered to individual units in home, businesses, and other structures from power plants or power stations via the transmission lines. Thus, the electrical grid was a unidirectional system for the transmission of electric power. Over time, through the invention and development of electric-consuming home and workplace technologies, the demand for electric power increased. As the demand increased, more power plants or power stations were established. However, the power plants could not keep up with the demand, especially during peak times. As a result, the demand was tracked in order to generate demand patterns.

Due to the increase in demand for electric power, there were growing environmental concerns and pressure to develop a highly controllable and more efficient electrical transmission system. In response, through the advancement of digital technology, "smart grid" technology was developed. Smart grid technology permits two-way communication between a utility and its customers. Thus, the second pathway of communication allows feedback from the customer to the utility. For example, the utility may receive information regarding power outages and isolate the outage by rerouting the electricity in order to prevent a large-scale outage or blackout. In addition, digital communication between the utility and the customer allows the smart grid to better respond to energy demands. For instance, the smart grid permits integration of smart meters and smart appliances in an advanced metering infrastructure (AMI). Smart meters and smart appliances provide energy consumption feedback to the utility. In response to demand patterns, the smart appliances may adjust their duty cycle to avoid operation during peak times (i.e., when the energy is in high demand).

Although scheduling the duty cycle of the smart appliances to operate in low demand times can reduce the load on the smart grid system, there is a need to determine if certain smart appliances in the smart grid system are more or less efficient than other similar smart appliances. A schedule of smart appliance duty cycles provides efficiency as a function of time. However, to provide more efficiency, other aspects of the smart appliance must be analyzed. Such aspects may be the make, model, and manufacturer of the smart appliance, and the number of users of the smart appliance, for example.

Therefore, there is a need for a system and method for determining the efficiency of a smart appliance in a smart grid network and providing feedback based of efficiencies of similar smart appliances in the smart grid network.

SUMMARY

The present invention is a system and method for determining the efficiency of a smart appliance in a smart grid network and providing feedback based of efficiencies of similar smart appliances in the smart grid network. In one embodiment, the system includes a central controller in digital communication with a network component of a smart grid. The smart grid has one or more units having a first utility and a second utility, each wirelessly connected to the central controller. The first utility and the second utility are associated with one or more ADLs. An energy consumption measurement is calculated for the first utility and the second utility for one ADL. If the energy consumption measurement for the second utility for that ADL is larger than the energy consumption measurement for the first utility for that same ADL, a signal is transmitted from the central controller to the second utility.

In another embodiment, the invention is method for determining the efficiency of a smart appliance in a smart grid network. The method includes the steps of (i) providing a central controller in digital communication with a network component of a smart grid, the smart grid including one or more units with one or more utilities in digital communication with the central controller; (ii) determining, via the, central controller, a first utility and a second utility associated with an ADL; (iii) determining, via the central controller, a power consumption profile for each of the first utility and the second utility associated with the ADL; (iv) defining a maintenance threshold where the second utility has a power consumption profile that is more power consuming than the power consumption profile of the first utility; and (v) transmitting a signal to a user interface, via the central controller, indicating that the maintenance threshold has been reached.

In an alternative embodiment, the invention is a computer program product for determining the efficiency of a smart appliance in a smart grid network, the computer program comprising a computer readable storage medium having program instructions embodied therewith, wherein the computer readable storage medium is not a transitory signal per se, the program instructions are readable by a computer to cause the computer to perform a method. The method includes the steps of comprising the steps of: (i) attributing a first appliance in a smart grid network to an ADL, wherein in a first operating position, the first appliance is consuming energy below a maintenance threshold and in a second operating position, the first appliance is consuming energy above a maintenance threshold; (ii) receiving historical data and appliance meta data from the first appliance; (iii) determining, based at least in part on the historical data and appliance meta data if the first appliance is the second operating position; and (iv) transmitting a signal to a user interface indicating that the first appliance is in the second operating position.

BRIEF DESCRIPTION OF THE DRAWINGS

The present invention will be more fully understood and appreciated by reading the following Detailed Description in conjunction with the accompanying drawings, in which.

DETAILED DESCRIPTION

Referring to the Figures, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
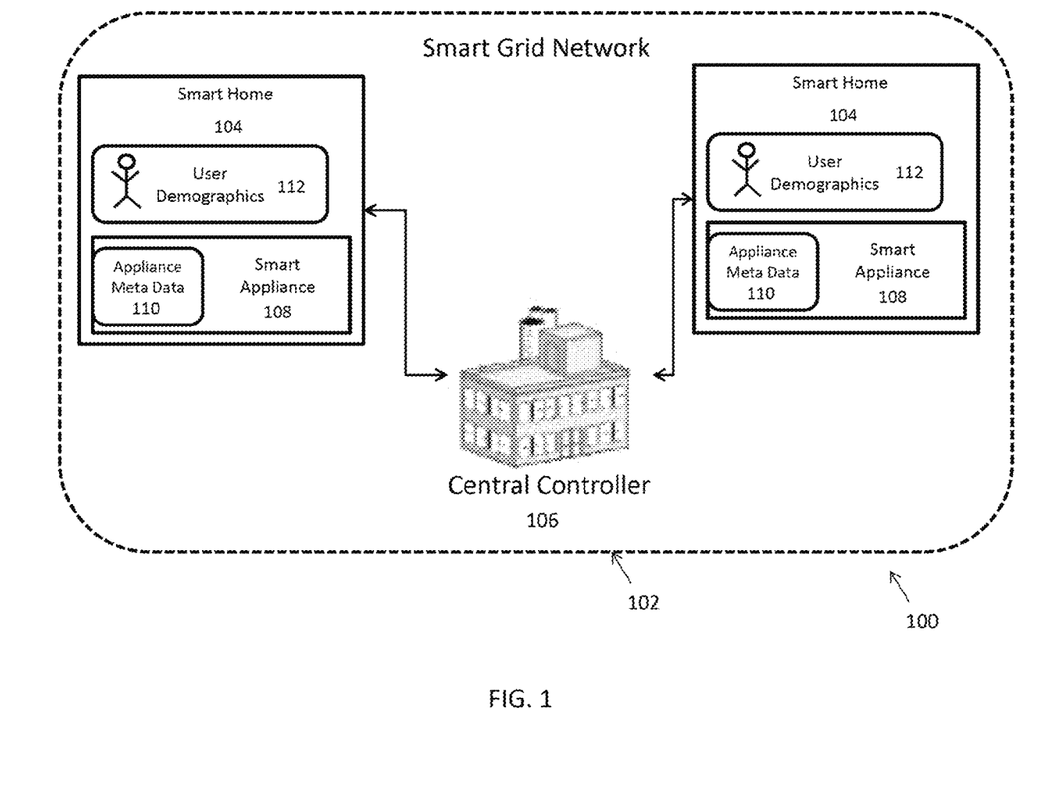
FIG. 1 is a diagram of a non-limiting illustrative embodiment of the system.

Referring again to the drawings, wherein like reference numerals refer to like parts throughout, there is shown in FIG. 1 a diagram of a non-limiting illustrative embodiment of the system 100. As shown in the depicted embodiment, the system 100 comprises a smart grid network 102 of a plurality of smart homes 104. The smart homes 104 in the smart grid network 102 send digital signals to a central controller 106 of the smart grid network 102. The smart homes 104 in the smart grid network 102 each have a one or more smart appliances 108 (or utilities). Smart appliances 108 include, but are not limited to, appliances such as refrigerators, washers, dryers, ovens, and dishwashers.

Still referring to FIG. 1, for each smart appliance 108 in the smart grid network 102, there is appliance meta data 110. Appliance meta data 110 may include information of the model, make, and manufacturer, along with other details. The appliance meta data 110 is collected by the smart home 104 and transmitted to the central controller 106. In one embodiment, any missing appliance meta data 110 is derived by the central controller 106. In such embodiment, the central controller 106 derives the missing meta data 110 using meta data available from similar smart appliances 108 (e.g., in functionality, manufacturer, make, model, etc.) on the smart grid network 102 (or a different sub-station). In one embodiment, the appliance meta data 110 is associated with one or more Activities of Daily Living (ADLs) before it is transmitted to the central controller 106. An ADL is a term often used in the healthcare industry to refer to a person's daily self-care activities, such as eating, bathing, dressing, personal hygiene and grooming, toileting, and transferring (i.e., walking, and getting in/out of a bed or chair). It is possible to categorize ADLs based on the kind of the functionality they serve or the time at which the smart appliance 108 used needs to be activated. Therefore, the appliance meta data 110 may contain data that associates an ADL with the smart appliance 108. For example, if the smart appliance 108 is a washer, the appliance meta data 110 associates use of the washer with the ADL of doing laundry. In another example where the smart appliance 108 is a refrigerator, the associated ADL is eating. Other appliance meta data 110 can include the time that use of the smart appliance 108 begins or ends, among other metrics.

In addition to receiving appliance meta data 110, the central controller 106 also receives user demographics 112 from each smart home 104. User profiles and user demographics 112 may be stored as data at the smart home 104. The user profile and user demographics 112 may include data related to the size of the smart home 104, the number of rooms in the smart home 104, and the number of people living in the smart home 104, for example. In one embodiment, user demographics 112 may be used to associate the criticality level to a smart appliance 108 or to the ADLs associated with that smart appliance 108. The user profile and user demographics 112 are then transmitted to the central controller 106 of the smart grid network 102.

Figure 2:
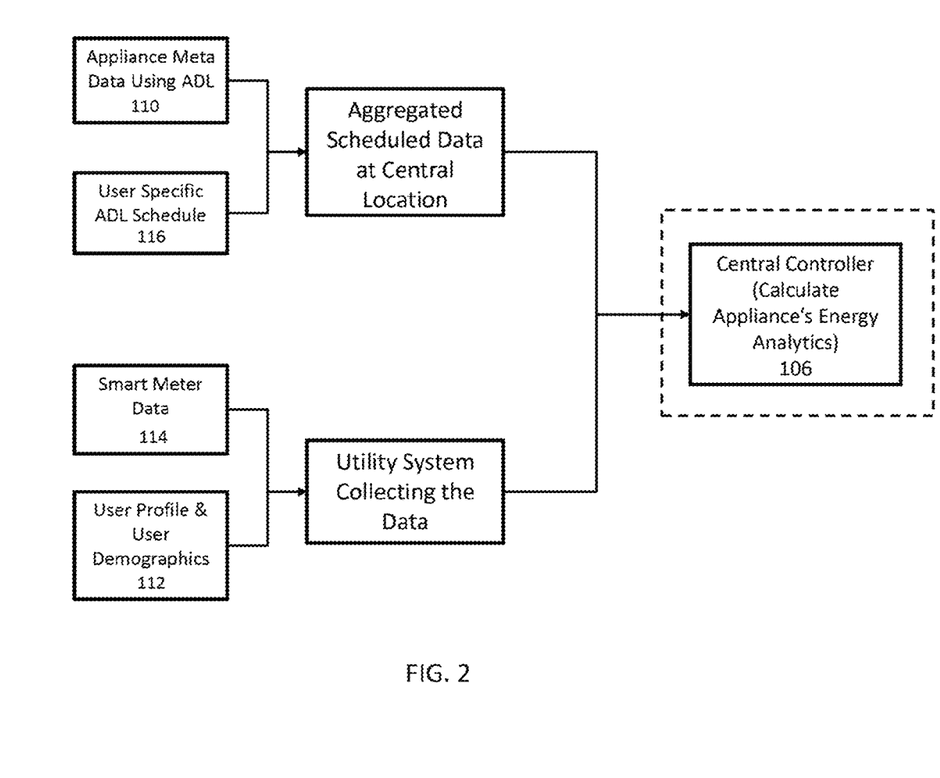
FIG. 2 is a diagram of a non-limiting illustrative embodiment of factors for calculating energy analytics for a smart appliance.

Referring now to FIG. 2, there is shown a diagram of a non-limiting illustrative embodiment of factors for calculating energy analytics for a smart appliance 108. In the depicted embodiment, the central controller 106 of the smart grid network 102 is shown. The system 100 runs as part of a utility application set. In an alternative embodiment, the system 100 runs as a cloud-based third party service. As shown in FIG. 2, to calculate the energy analytics of the smart appliance 108 (utility), the system 100 first receives energy consumption measurements from the smart appliances 108 of each smart home 104 in the smart grid network 102. The energy consumption measurement for each smart appliance 108 is stored as historical data at the central controller 106. Next, the system 100, via the central controller 106, derives the level of efficiency of each smart appliance 108 by comparing the energy consumption measurement of that particular smart appliance 108 across all users (i.e., smart homes 104) in the smart grid network 102. Based on the comparative results, the central controller 106 may recommend that the user replace or provide maintenance to the inefficient smart appliance 108.

First, to calculate the energy analytics of the smart appliances 108 in the smart grid network 102, the central controller 106 receives a variety of digital data from different users (i.e., smart homes 104) in the smart grid network 102. As shown, the central controller 106 receives appliance meta data 110 and ADLs associated therewith, user profile and user demographics 112, smart meter data 114, and other user specific ADL schedules 116. For example, the smart meter data 114 (in addition to the appliance meta data 110) provides energy consumption feedback for the smart appliances 108 and other energy consuming devices in the smart home 104.

In addition, the central controller 106 also receives user specific ADL schedules 116, at the sub-station level, for example. In one embodiment, the system 100 runs at a sub-station level and considers only ADLs within that sub-station level. In another embodiment, the system 100 runs at a grid level and considers the different sets of ADLs grouped by their respective sub-station associations. Thus, the central controller 106 has the start time and end time of specific smart appliances 108 from data of the user specific ADL schedules 116. The user specific ADL schedules 116 are reconciled with energy usage acquired by the smart appliance 108 through advanced metering infrastructure (AMI) network in the system 100. The system 100 also leverages the user's profile demographics 112 to establish the relative comparison on how many people live in a particular smart home 104, the size of the smart home 104, etc.

In the embodiment shown, the appliance meta data 110 associated with an ADL and user specific ADL schedules 116 are aggregated such that scheduled data is at a central location. Also in the depicted embodiment, the smart meter data 114 and the user profile and user demographics 112 are collected by the smart appliance 108 (i.e., utility) before the data is transferred to the central controller 106. Finally, with the above referenced digital data, the system 100 calculates the energy analytics of the smart appliances 108. The following variables are used in calculating the energy consumption of the smart appliances 108 in the smart grid network 102.

First, consider the ADLs of importance from the list of all the ADLs available: $(1, 2, \ldots, i, \ldots, m)$=the indices of the ADLs of importance Next, consider all the smart appliance 108 associated with the ADLs of importance: $(1, 2, \ldots, j, \ldots, n)$=indices of the smart appliances 108 associated with the above ADLs.

Thereafter, list the ADLs and their associated smart appliances 108. For all "i" belongs to [1,m], $ADL_1 \rightarrow Appliance_{i1}, Appliance_{i2}, \ldots, Appliance_{ik}$; where i1, i2, . . . , ik belong to [1,n]. Here, "k" is the max index for any ADL.

Next, the ADLs are grouped based on the smart appliances 108 being used by those ADLs, in the following way: $(G1, G2, \ldots, Gk)$=Groups of ADLs with 1, 2, 3, . . . , k smart appliances 108 being used by each ADL in that group. There can be only "k" such groups as the max number of smart appliances 108 associated with any ADL is "k", as defined above.

Utilizing the above variables and associations, power consumption for all the smart appliances 108 associated with the ADLs in group G1 is computed. If the power consumption profile is available at the end of processing the ADLs in G1 for all the smart appliances 108 (1, 2, . . . , j, . . . , n) above, there is no need to process the ADLs in groups G2, G3, . . . , Gk. If the power consumption profile is not available for all the smart appliances 108 after processing the ADLs in G1, power consumption for the smart appliances 108 associated with the ADLs in G2, which are not present in group G1, is computed. For example, if an ADL in G2 uses both the smart appliances 108 present in G1, then the power consumption profile is available and no further computation is required for that ADL. If an ADL in G2 uses two smart appliances 108, Appliance1 and Appliance2, and Appliance1's power consumption profile is computed in processing G1, further computation is required. The power consumption of Appliance1 is subtracted from the total power consumed by the ADL to compute the power consumption of Appliance2. If an ADL in G2 uses two smart appliances 108 not present in G1, then the power consumption profile for these two smart appliances 108 can be computed together.

By repeating the above computational process for all the ADLs in Groups 3, 4, . . . , k; it is possible to compute the power consumption for all the individual smart appliances 108, or smart appliances 108 that appear always together up to size "k".

The power consumption of the smart appliances 108 with size 1, 2, . . . , k is computed in the following way.

First, consider the size: (1, 2, . . . , as)=the indices of the smart appliance 108 sets. The max index "as" $\leq m*k$, since there are only "m" ADLs and up to maximum of "k" smart appliance 108 sets could be generated from the smart appliances 108 used by any ADL. In some embodiments, the power consumption of smart appliances 108 is determined based in part on the start time ("[s,e]") of the ADL as computed by an ADL scheduling method run at the sub-station level of the smart grid network 102, similar to that disclosed in U.S. patent application Ser. No. 15/708,601 assigned to the assignee hereof and incorporated by reference herein in its entirety. Power consumption for a smart appliance 108 set "as" is computed as the average value of the difference between the smart meter power consumption with one or more ADLs scheduled along with the non-ADL demand profile, and the smart meter power consumption without ADLs scheduled along with a similar non-ADL demand profile, as shown below.

PowerConsumption$_{as}$=Average over t in [s,e] (SmartMeter$_{h,t}^{ADL-on}$−SmartMeter$_{h,t}^{ADL-off}$).

[s, e] is the start and end time of the ADL as computed by the ADL scheduling method running at a sub-station level SmartMeter$_{h,t}^{ADL-off}$: reading of the smart meter at time "t" in the house "h" with the demand being only the non-ADL demand.

SmartMeter$_{h,t}^{ADL-on}$: reading of the smart meter at time "t" in the house "h" with the demand being the non-ADL demand plus the ADL demand with the ADL scheduled from time [s, e].

Power consumption for any smart appliance 108, or set of smart appliances 108 together, is computed by sampling the power consumption historical data. A smart meter "h" could be selected for different geographies, different owner profiles of the smart meter "h", or ADLs scheduled at different times, etc. The PowerConsumption$_{as}$ profile for a set of smart appliances 108 is computed as the average over different samples from the historical data (i.e., smart meter readings).

Figure 3:
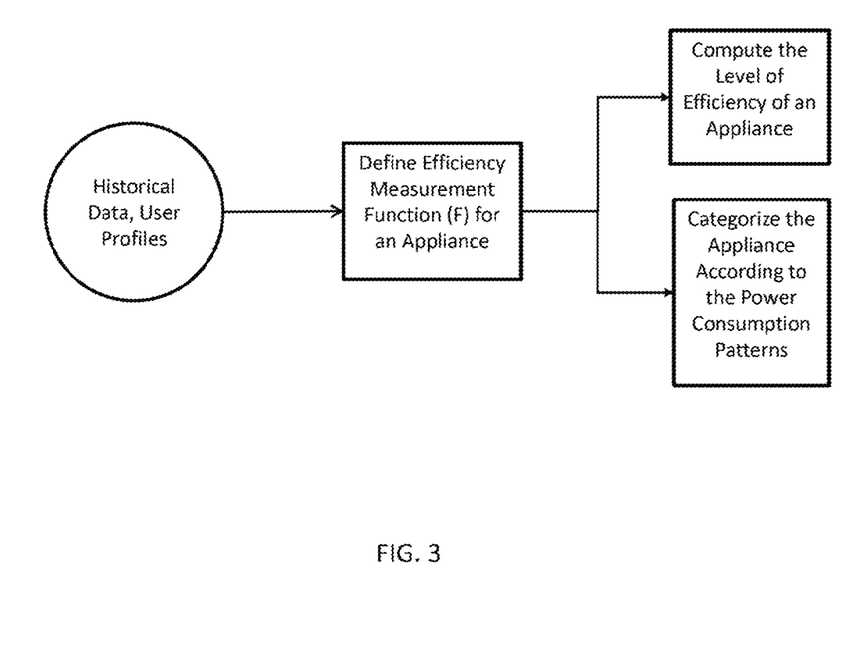
FIG. 3 is a diagram of a non-limiting illustrative embodiment of a method for determining an efficiency measurement function (F) of an appliance to determine and compare appliance efficiencies.

Turning now to FIG. 3, there is shown a diagram of a non-limiting illustrative embodiment of method for determining an efficiency measurement function (F) of an appliance to determine and compare appliance efficiencies. A function (F) is used to attach a value to indicate the level of efficiency of smart appliances 108. The higher the value, the higher the level of efficiency of the smart appliance 108. Function (F) takes into account the following two aspects. First, using the historical data associated with the smart appliance 108 at the central controller 106, it is possible to perform data mining by correlating samples with past samples to determine temporal anomalous patterns (associated with smart appliances 108) by considering various contexts such as "time of day". Here, an anomalous pattern can indicate "more power consumption" by the smart appliance 108. Second, correlating the power consumption patterns of a smart appliance 108 of a user (i.e., smart home 104) with that of other users (having similar smart appliances 108) can be used to determine the percentage of the smart appliances 108 that consume less power. Using appliance meta data 110 information at the central controller 106 as well as the user profile and user demographics 112 as provided by third party data, it is possible to identify the smart appliances 108 that are similar across different users.

With the power consumption profiles for each of the smart appliances 108 in the smart grid network 102, a user-user "weighted social graph" can be constructed where the nodes in the network represent the users and the edge between a pair of users represents the similarity between the set of smart appliances 108 used by the users. The greater the number of smart appliances 108 used by a pair of users, the greater the weight on the edge between the pair of users. To generate the ranking, the input is the assumption that one user or a small number of users have smart appliances 108 consuming more power. The required output is a ranking of the remaining users according to the probability that they have a smart appliance 108 consuming more power than usual. Using a popular social network analysis technique of similarity computation among users, it can be determined if users are more close to those possessing smart appliances 108 consuming more power. Based on the computed similarity scores, a ranking or order of the remaining users can be produced.

Using the power consumption profiles calculated above, such temporal anomalous patterns associated with smart appliances 108 can be determined. For a given user and a given smart appliance 108, the historical data can be organized in the following format. A multi-dimensional vector, known as the power-consumption vector, is created by discretizing the time of day into a fixed number of slots. For example, a 24-dimensional vector is created corresponding to each hour of the day. Each dimension (slot) in the power-consumption vector indicates the power consumed by the smart appliance 108 at a given day. The result is a collection of such multi-dimensional power-consumption vectors for a fixed time period in the past, the last 6 months or two years, for example. Then, by using a K-means clustering algorithm, it is possible to identify which multi-dimensional vectors of the smart appliance 108 are anomalous, along with the extent of anomalous behavior. The anomalous pattern can indicate "more power consumption" by the smart appliance 108. The greater the number and extent of anomalous patterns associated with a smart appliance 108, the greater the probability that the smart appliance 108 is labeled "more power consuming".

Figure 4:
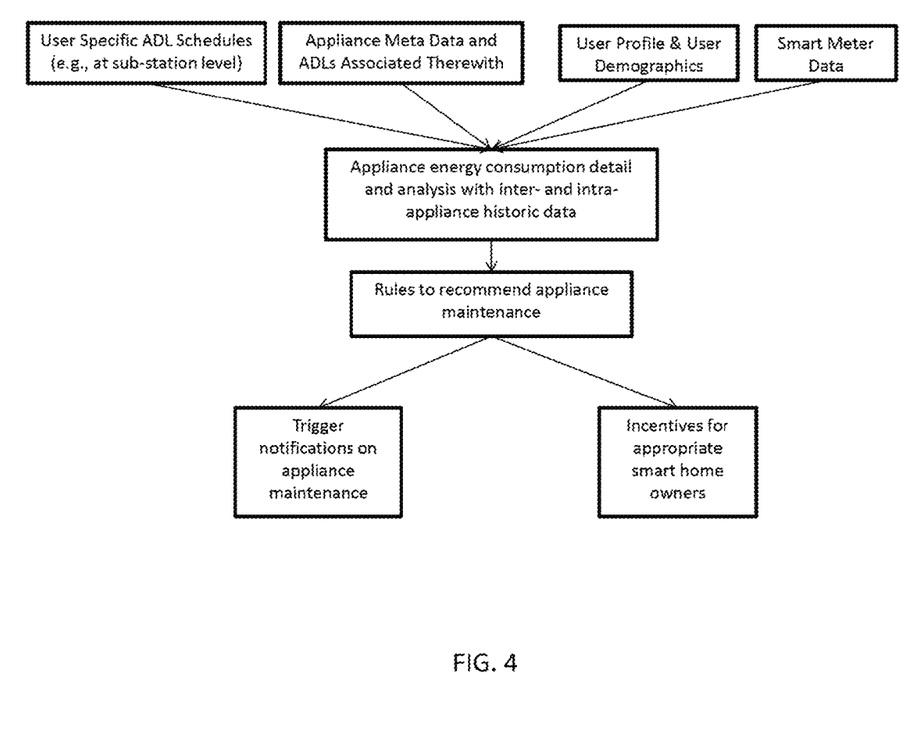
FIG. 4 is a flowchart of a non-limiting illustrative embodiment of a method of providing feedback based of efficiencies of similar smart appliances in the smart grid network.

Turning now to FIG. 4, there is shown a diagram of a non-limiting illustrative embodiment of a flowchart for the method of providing feedback based of efficiencies of similar smart appliances 108 in the smart grid network 102. After a comparison of efficiencies of the smart appliances 108 in the smart grid network 102, the system 100 makes recommendations to the users of the smart appliances 108 according to a programmed rule set. Based on the level of efficiency of each smart appliance 108 as derived in the previous steps, the "more power consuming" smart appliances 108 are tagged as "inefficient". In one embodiment, the smart appliance 108 is tagged as "inefficient" when the efficiency level falls below certain threshold value (typically user defined). For each inefficient smart appliance 108, a signal is sent to the smart appliance 108. The purpose of the signal is to indicate to the user that replacement of the inefficient device or device maintenance is required. In one embodiment, the signal is sent to the display of the smart appliance 108, which conveys the message that maintenance or replacement of the smart appliance 108 is required. In another embodiment, the signal is a notification, which is a SMS alert sent to the user (e.g., owner of the smart home 104) associated with the smart appliance 108.

As mentioned above, the signals are transmitted to the user of the smart appliance 108 in the smart grid network 102 according to a rule set. In one embodiment, the geography of a user (e.g., owner of a smart home 104) can be used to decide the time at which the signal (or notification) regarding the status of the smart appliance 108 is triggered. For example, if a user is located in a metro locality, it is possible that the maintenance or replacement of the smart appliance 108 may be quickly executed. Therefore, for users in the metro locality, it is permissible for signal transmission after the performance of the smart appliance 108 is identified to be below the threshold level. In another example, if the user is located in a remote/rural locality, the maintenance or replacement may require more time for completion. Therefore, for users in the remote/rural locality, the signal may be programmed for transmission just before the threshold level of performance of the smart appliance 108 is reached.

Figure 5:
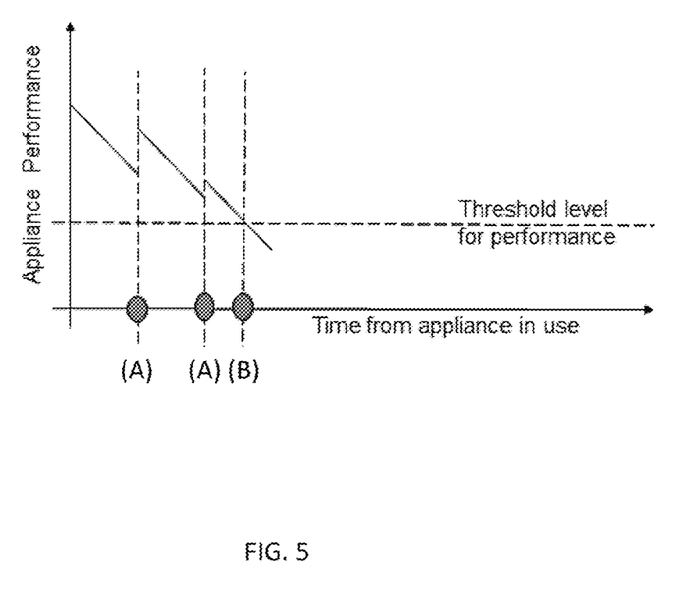
FIG. 5 is a chart of a non-limiting illustrative embodiment of a rule set for triggering transmission of a signal regarding the efficiency status of a smart appliance.

In an alternative embodiment, it is possible to determine a time at which the signal regarding the status of the smart appliance 108 is transmitted based on the service history of the smart appliance 108. For example, as depicted in FIG. 5, if the smart appliance 108 is undergoing service over time as per the service recommendation in a user manual, it is possible to delay transmission of the signal until the performance of the smart appliance 108 is beyond the threshold. In FIG. 5, the times when service occurred is annotated as "(A)" and the time to trigger transmission of the signal is annotated as "(B)". In another example, if the service history of the smart appliance 108 does not show adherence to the appliance service requirements in the user manual, the signal may be transmitted before the performance of the smart appliance 108 reaches the threshold level.

In another embodiment, it is possible to determine a time at which the signal regarding the status of the smart appliance 108 is transmitted based on the nature of the performance degradation of the smart appliance 108 over time. For example, if the performance of the smart appliance 108 degrades linearly over time, it is permissible to delay transmission of the signal until the performance of the smart appliance 108 is beyond the threshold. In another example, if the performance of the smart appliance 108 degrades exponentially over time, then the signal may be transmitted before the performance of the smart appliance 108 reaches the threshold level.

Determining the efficiency of a smart appliance 108 also allows for implementation of an incentive-based pricing mechanism for the smart grid network 102. For example, user (e.g., owners of smart homes 104) of the smart grid network 102 can be charged based on power consumption. A power consumption pricing mechanism will incentivize users to voluntarily replace inefficient smart appliance 108 or provide maintenance for the inefficient smart appliance 108 as it helps to improve the quality of the smart grid network 102.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A smart grid system, comprising:
one or more computer processors;
one or more computer readable storage devices; and
computer program instructions, the computer program instructions being stored on the one or more computer readable storage devices for execution by the one or more computer processors, the computer program instructions comprising instructions to:
attribute a first appliance and a second appliance in the smart grid system to an activity of daily living (ADL), wherein the first appliance and the second appliance are the same;
receive historical data and appliance meta data from each of the first appliance and the second appliance;
assign a first efficiency value to the first appliance and a second efficiency value to the second appliance based, at least in part, on the first and second appliances respective historical data and appliance meta data;
determine, based on at least in part, on a comparison of the first efficiency value of the first appliance and the second efficiency value of the second appliance, that the first device is consuming an amount of energy above a maintenance threshold; and
transmit a signal to a user interface of the first appliance indicating that the first appliance is consuming an amount of energy above the maintenance threshold.

2. The smart grid system of claim 1, wherein the historical data and appliance meta data from each of the first appliance and the second appliance is based, at least in part, on one or more of: a user specific ADL schedule, smart meter data, a user profile, and user demographics.

3. The smart grid system of claim 2, wherein the user specific ADL schedule includes a start time and a stop time for each ADL.

4. A method for determining the efficiency of smart appliances in a smart grid network, comprising:
attributing a first appliance and a second appliance in the smart grid network to an associated activity of daily living (ADL), wherein the first appliance and the second appliance are the same;

receiving historical data and appliance meta data from each of the first appliance and the second appliance;

assigning a first efficiency value to the first appliance and a second efficiency value to the second appliance based, at least in part, on the first and second appliances respective historical data and appliance meta data;

determining, based on at least in part, on a comparison of the first efficiency value of the first appliance and the second efficiency value of the second appliance, that the first device is consuming an amount of energy above a maintenance threshold; and transmitting a signal to a user indicating that the first appliance is consuming an amount of energy above the maintenance threshold.

5. The method of claim 4, wherein the historical data and appliance meta data from each of the first appliance and the second appliance is based, at least in part, on one or more of: a user profile, user demographics, smart meter data, and a user specific ADL schedule.

6. The method of claim 4, further comprising displaying the signal on a display on the first appliance.

7. The method of claim 4, wherein the signal is a SMS message and the user interface is on a mobile device.

8. A computer program product for determining the efficiency of a smart appliance in a smart grid network, the computer program comprising a computer readable storage medium having program instructions embodied therewith, wherein the program instructions are readable by a computer to cause the computer to perform a method comprising the steps of:

attributing a first appliance and a second appliance in a smart grid network to an activity of daily living (ADL), wherein the first appliance and the second appliance are the same;

receiving historical data and appliance meta data from each of the first appliance and the second appliance;

assigning a first efficiency value to the first appliance and a second efficiency value to the second appliance based, at least in part, on the first and second appliances respective historical data and appliance meta data;

determining, based on at least in part, on a comparison of the first efficiency value of the first appliance and the second efficiency value of the second appliance, that the first device is consuming an amount of energy above a maintenance threshold; and transmitting a signal to a user interface indicating that the first appliance is consuming an amount of energy above the maintenance threshold.

9. The computer program product of claim 8, wherein the step of receiving historical data and appliance meta data from each of the first appliance and the second appliance, further comprises the step of receiving at least one of smart meter data, a user profile, user demographics, and a user specific ADL schedule, from the first appliance and the second appliance, respectively.

10. The computer program product of claim 9, wherein the user demographics comprise the size of a unit containing a particular type of appliance and the number of users of the particular type of appliance.

11. The computer program product of claim 8, further comprising the steps of:

calculating a first usage cost when the first appliance is consuming an amount of energy below the maintenance threshold; and calculating a second usage cost when the first appliance is consuming an amount of energy above the maintenance threshold.

12. The computer program product of claim 11, wherein the second usage cost is larger than the first usage cost.

13. The computer program product of claim 8, wherein the first appliance is in a first unit in the smart grid network and the second appliance is in a second unit in the smart grid network.

14. The computer program product of claim 8, wherein the second efficiency value is smaller than the first efficiency value.

15. The computer program product of claim 8, further comprising the step of storing the first efficiency value and the second efficiency value as historical data.

* * * * *